United States Patent [19]

Downes et al.

[11] Patent Number: 4,769,761
[45] Date of Patent: Sep. 6, 1988

[54] APPARATUS AND METHOD FOR ISOLATING AND PREDICTING ERRORS IN A LOCAL AREA NETWORK

[75] Inventors: Robert W. Downes, Raleigh; Wilson E. Smith, Bahama, both of N.C.

[73] Assignee: International Business Machines Corporation, Armonk, N.Y.

[21] Appl. No.: 916,913

[22] Filed: Oct. 9, 1986

[51] Int. Cl.$^4$ .............................................. G06F 11/00
[52] U.S. Cl. .......................................... 364/514; 371/4
[58] Field of Search .................. 364/514, 552, 184; 371/5, 3, 4, 8, 11, 16

[56] References Cited

U.S. PATENT DOCUMENTS 4,627,055 12/1986 Mori et al. ............................ 371/16
4,661,953 4/1987 Venkatesh et al. .................... 371/16

Primary Examiner—Parshotam S. Lall
Assistant Examiner—Ellis B. Ramirez
Attorney, Agent, or Firm—Joscelyn G. Cockburn

[57] ABSTRACT

Stations of a communications network maintain a set of counters which measure the frequency of occurrence of soft errors in said network. Periodically, each station generates and transmits an error report containing the error counts to a ring error monitor provided in one of the stations. The ring error monitor analyzes the report and calculates and stores weighted error counts for stations in an error domain. The stored error counts are integrated, over a selected time interval, and compared with a threshold value normal for a communications network, operating at acceptable error rate. The results of the comparison set error flags if the limits are exceeded indicating possible future station failures.

14 Claims, 6 Drawing Sheets

FIG. 3
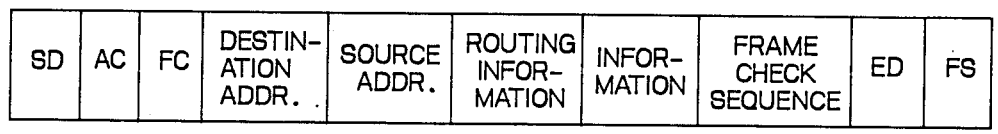
FIG. 4A
MAC FC FIELD
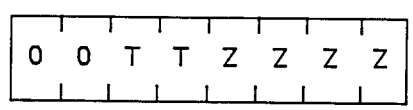
FIG. 4B
MAC INFOR FIELD
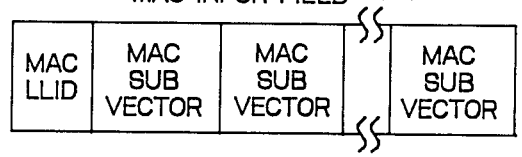
| | ERROR WEIGHT | ALERT FLAG | RPT STATION ADDR | NAUN ADDR |
|---|---|---|---|---|
| A | | | | |
| B | | | | |
| C | | | | |
| ⋮ | | | | |
| N | | | | |
FIG. 6
ISOLATING TABLE

| ERROR COUNTER TYPE | RELATIVE SCALED WEIGHTS | |
|---|---|---|
| | REPORTING STATION | NAUN |
| LINE ERROR | 2 | 2 |
| INTERNAL ERROR | 4 | 0 |
| BURST ERROR | 2 | 2 |
| ARI/FCI ERROR | 0 | 5 |
| ABORT TRANSMIT ERROR | 4 | 0 |

APPARATUS AND METHOD FOR ISOLATING AND PREDICTING ERRORS IN A LOCAL AREA NETWORK

BACKGROUND OF THE INVENTION

1. Field of the Invention

The invention relates to communications networks in general and more particularly to predicting stations which are likely to be failing.

2. Prior Art

Communications networks are facilities which allow users to exchange information. A typical communications network consists of a communication highway formed from a conductive media and a plurality of stations called nodes connected to said conductive media. A node may include copiers, computers, telephones, printers, etc. Such communications networks are in small geographical areas such as an office or in large geographical areas such as office buildings, college campuses and business establishments.

Because most communications networks are distributed over a finite geographical area, it is desirable to have a central location, with management facility, from which an operator monitors and manages the network.

The management facility would not only identify failed or failing devices but also predict when a communications network is going to fail. Thus, the operator would be given an opportunity to remove the failing device before it causes a catastrophic failure.

The monitoring and logging of errors in a machine or the like is well known in the prior art. Usually, if the machine is running satisfactorily, no action is taken. However, in the absence of satisfactory performance, an operator reviews a printout of an error log to identify probable sources of the error. Even though the post analysis technique works well for its intended purpose, it is unacceptable because it is available only after the machine is down. This type of failure is catastrophic and cannot be tolerated in today's environment where the availability of information is important to the orderly conduct of business.

U.S. Pat. No. 4,589,080 also provides what appears to be a pre-analysis technique for predicting failure in a copier. In this patent selected points in the copier are monitored by signal lines connected to the copier. If a signal is detected on a signal line, the time of occurrence is stored in the computer's memory at a location associated with the point that caused the signal. Eventually an array of the times of operation of each monitored point will be stored. The computer then calculates the difference between the times stored for selected pairs of the monitored points and stores these, as intervals, in additional locations of the memory. The intervals are combined to give calculated statistical results (mean, deviation, etc.) each of which is then compared against predetermined values normal for correctly operating copiers also stored in the memory. The results of the comparison set error flags if the limits are exceeded indicating possible future copier failures.

U.S. Pat. No. 4,339,657 describes a technique for error logging by integrating error counts over a selected number of operations and comparing the results with a criterion. An exception is logged if the number of errors exceeds the criterion, but the exception log is cleared if the number of errors is less than the criterion. However, the prior art does not provide apparatus and/or techniques for predicting failure in a communications network by analyzing error counts in messages generated and supplied to a central station from stations in the network.

SUMMARY OF THE INVENTION

Stations in the communications network prepare and transmit to a facility called Ring Error Monitor (REM) error counts representative of errors occurring in an error domain. REM collects, analyzes and logs error reports received from stations attached to the network. All error reports sent by stations are sent to a group address reserved for REM. Therefore, if multiple REMs are present on a network, they all receive error reports generated by stations attached to that network.

The function of REM is to determine when a non-random or excessive error condition is present on the network on which it resides and, if possible, isolate the most probable source of the errors to a fault domain, comprising two adjacent active stations attached to the network and the physical medium between them. REM detects excessive errors by analyzing error reports sent by stations attached to its network as they arrive and determining whether soft errors are occurring at a rate that degrades the performance of the network. When REM detects such a condition, it may notify a network manager, indicating the source of the error.

REM maintains a table of weighted error counts for each station attached to its network from which it has recently received a soft-error report. The weighted error count accumulated for a station is used as an indication of the likelihood that the station is causing excessive errors. When a soft-error report is received, the information contained in the isolating error counters is used to accumulate the weighted error count for the sending station and its nearest active upstream neighbor.

When the accumulated error count for a station exceeds a threshold, REM may notify the network manager that excessive errors have been detected. REM provides the addresses of the stations in the fault domain in which it has detected the errors in the notification message, thus providing information to allow a human operator to reconfigure the network to bypass noisy sections.

Since even random errors may cause the accumulated weighted error count for a station to exceed the threshold eventually, a fixed value is periodically subtracted from the weighted error count for each station for which REM is maintaining a count. As a result of this periodic decrementing of the weighted error counts, only the stations continuously accumulating weighted error counts at a rate faster than the decrement rate will have error counts that grow with time.

In one feature of the invention both the threshold and decrement intervals are adjusted. This allows the error analysis process to automatically adjust itself to the error rate the network is currently experiencing.

BRIEF DESCRIPTION OF THE DRAWINGS

FIG. 3 shows a frame format for a basic transport unit that carries messages within the network.

FIGS. 4A-B shows a frame format for a Machine Access Control (MAC) frame which carries error reports from stations in the network to the network control station having REM.

FIG. 6 is a graphical representation of the Ring Error Monitor (REM) Isolating Table.

FIG. 7 is a table showing types of error counters and relative scaled weights assigned to each counter.

DESCRIPTION OF THE PREFERRED EMBODIMENT

The present invention may be used for isolating and predicting errors in any type of communications network. It works well and it has been implemented in the IBM Local Area Network and, as such, will be described in that environment. However, this should not be constructed as a limination upon the scope of the invention since it is within the skill of one skilled in the art to adapt the invention to other types of communications networks without departing from the scope and spirit of the present invention.

Figure 1:
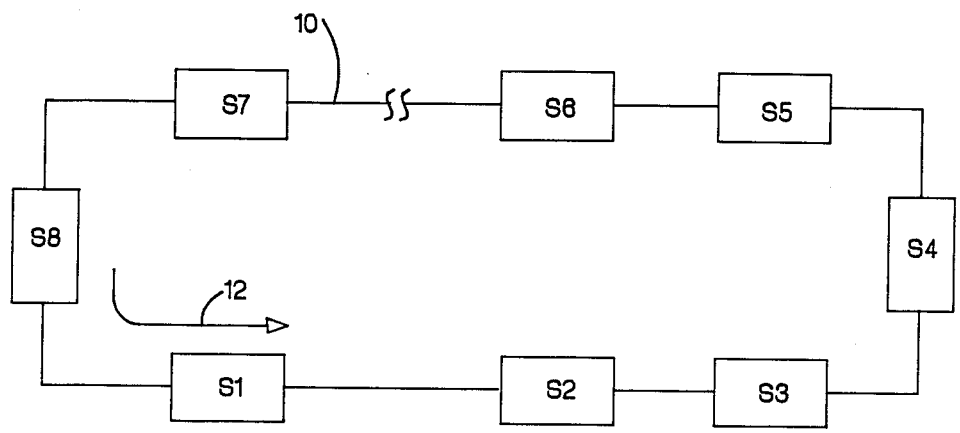
FIG. 1 shows a communications network incorporating the invention.

FIG. 1 shows a schematic for a serial loop local area network. This network is similar to the announced IBM token ring local area network. Details of the token ring local area network are set forth in publication "IBM Tokens Ring Network Architecture," Reference No. 6165877. Thus, only sections of the token ring local area network that are necessary for the understanding of the present invention will be described hereinafter.

The token ring network comprises a communications medium identified by numeral 10. The medium is configured into a ring with a plurality of stations S1-S8 connected thereto. Although FIG. 1 shows 8 stations, in reality much more than eight or fewer than eight stations may form the ring. A ring station is a combination of functions that allows a device such as a PC, telephone, work station, etc. to connect to the ring and to use the link access protocols (to be described subsequently). A ring station, such as S1-S8, transfers data to the ring where the data travels sequentlly from the ring station along the direction indicated by arrow 12. Each ring station repeats the data, checking it for errors, and copying it if appropriate. When the data returns to the originating ring station, the station removes it from the ring. Each ring station includes an adapter card and the device which the card attaches to the ring. The device may include personal computers, terminals, printers, etc. The IBM token ring network PC adapter card plugs into an IBM PC expansion slot and interconnects the PC to the communications media. The adapter card has a front end chip to communicate with the ring, a protocol handler to process information to and from the ring, and an interface to the IBM PC containing some shared random access memory (RAM). This interface communicates with the IBM PC via the I/O bus. Programmed I/O (PIO) and memory mapped I/O (MMIO) operations are used to access the adapter. A more detailed discussion of this adapter is given in U.S. Pat. No. 4,507,777 and a manual entitled "Technical Reference Token Ring Network PC Adapter", Form No. 69X7862. Both the patent and the manual are incorporated herein by reference. The manual is available from the IBM Corporation. A management station such as S8 (FIG. 1) provides management function for the ring. The management function includes the present invention (to be described hereinafter) which analyzes error reports transmitted from stations on the ring and based on the result of these reports indicates stations which are causing excessive errors on the ring. If an operator desires, the error causing station can be removed from the network.

Figure 2:
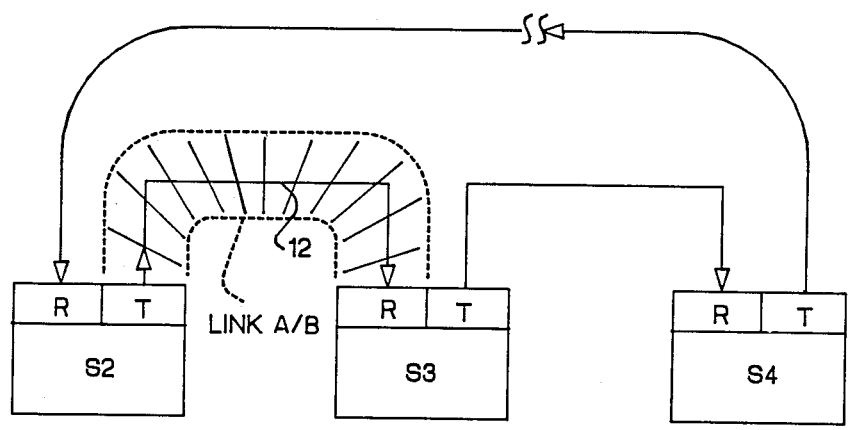
FIG. 2 shows elements in a fault domain.

The token ring in FIG. 1 cab be partitioned into a plurality of interconnected simplex links. FIG. 2 shows one of such simplex link AB interconnecting stations S2 and S3, respectively. Similar simplex links interconnect the other stations on the ring. Since all the links are identical, only link AB is described. It being understood that the description of link AB is equally applicable to the other links in the network. Each link represents an error domain which periodically prepares and sends error report messages to management station S8. The present invention is a software program running in the IBM PC in S8. The program analyzes the reports and identifies the probable error causing stations. Hereinafter the program will be called Ring Error Monitor or REM.

The error domain or link, such as AB, interconnects two stations such as S2 and S3. The error domain includes a transmitter (T) located in station S2. Station S2 is referred to as the nearest active upstream neighbor (NAUN) of S3. A receiver (R) forms also part of the error domain and is located in station S3. Station S3 is often referred to as the nearest active downstream neighbor (NADN) of station S2. The other element in error domain AB is the media 12 which interconnects the transmitter and receiver. Each station is provided with a set of error detectors and counters (not shown) which detects errors associated with the device on the node and the media interconnecting the node. In the IBM token ring error detectors are located in the receiver which terminates a link of each simplex link and in the protocol layer and hardware function of the node. A detailed description of the error detectors and counters is found in "IBM Token-Ring Network Architecture," Reference No. 6165877. The subject manual is corporated herein by reference.

In FIG. 2, station S3 has the responsibility of detecting its internal errors and errors that occur on receive link AB. Data transmission on a ring is called frames. The first station that detects the frame and error marks it. Frames on receiver link AB that are in error and are not marked are counted by error types. These counts are part of the error report frame which are generated in stations like S3 and forwarded to REM in station S8. Stated another way, these counts are incorporated in the error report frame.

FIG. 3 shows the format for a frame. The frame includes the following fields:
 starting delimiter (SD),
 access control field (AC),
 frame control field (FC),
 destination address (ADDR.) field,
 source address (ADDR.) field,
 routing information field,
 information field,
 frame check sequence field,
 ending delimiter field (ED), and
 frame status field (FS).

The frame is used for transporting messages throughout the token ring network. A special type of frame called medium access control (MAC) frames are used to control the operation of the token ring network and any ring station operations that affect the ring. The MAC frames are originated, received and acted upon by ring stations. As will be described subsequently, the error report which the stations generate and sends to the management station S8 (FIG. 1) is packaged in a MAC frame. Except for changes in the FC field and the information field, the MAC frame has the same overall format as FIG. 3. The format change for the FC field is shown in FIG. 4A and the format change for the information field is shown in FIG. 4B. The FC field (FIG. 4A) is the same for all MAC frames. Counting from left to right, the FC field is a single byte with the first two bits set to 0, the second two bits are reserved for future expansion, and the last four bits are control bits.

The information field (FIG. 4B) includes a MAC length identification field (MAC LLID) and a plurality of MAC sub-vectors. The MAC frame information field (MAC INFOR FIELD) is sometimes referred to as a major vector. The MAC length ID of the major vector is a four-byte field, the first two identifying the length of the field, and the following two bytes identifying the type of MAC frame. A more detailed description about the MAC frame is set forth in the IBM token ring network architecture reference manual and is incorporated herein by reference.

When the MAC frame carries an error report from a station to management station S8, the FC field of the MAC frame is set to X "00", the last two bytes of the MAC LLID field called the MVID are set to X "6029", the NAUN of the reporting station is carried in a MAC sub-vector, the physical location of the node is carried in another MAC sub-vector, isolating error counts are carried in another MAC sub-vector and non-isolating error counts are carried in another MAC sub-vector. Each of the MAC sub-vector fields includes as the first two bytes its length and a unique code, called the sub-vector ID, which identifies the information it is carrying. In a preferred embodiment the NAUN MAC sub-vector ID is an X "02" code. The physical location sub-vector ID is an X "0B" code. The isolating error counts ID is an X "2D" code. Finally, the non-isolating error counts ID is an X "2E" code. Since the present invention is primarily concerned with the isolating error counts, there will be no further discussion of the non-isolating error counts. Each type of isolating error count is recorded in a byte of the isolating MAC sub-vector field. Thus, a maximum count of 255 may be reported for any of the isolating error counts (to be described hereinafter).

Still referring to FIG. 3, FIG. 4A, and FIG. 4B, the destination address field of the error report MAC frame contains the address of the management station such as S8, FIG. 1. In the preferred embodiment of the invention the destination address is a group address. By using a group address multiple management stations on a loop will receive the same error report frames. The source address field of the error report MAC frame carries the address of the reporting station. With reference to FIG. 2, the address of the reporting station is the address of station S3. This also is the address of the receiver and terminating end of the simplex transmission link or error domain AB. Likewise, since the NAUN address is in a MAC sub-vector field, the transmitter end of the fault domain is the address of the NAUN.

In order to derive the error counts which are transmitted in the error report MAC frame, error detectors and error counters are distributed throughout the error domain AB in FIG. 2. Of course, similar error detectors and counters are distributed in each of the simplex links or error domains of the ring network of FIG. 1. Preferably, most of the error detectors and counters are located in station 3 which is the terminating end for simplex link or error domain AB. Separate error counters are used to accumulate counts for corresponding errors within an error report interval. During the error report interval, error counters are updated (incremented) if additional errors are detected by the error detectors in the station. At the end of the error report interval each active node prepares and transmits an error report MAC frame to the management station of the network and resets the error counters.

As described above, the address of the station which has the receiver of each link is placed in the source address field of the message. The address of the station containing the transmitter end of the fault domain is placed in a MAC sub-vector field. Isolating error counts are carried by count type in a separate sub-vector field of the error report MAC frame. In a preferred embodiment of the present invention five types of isolating error counters are provided and carried in the error report MAC frame.

FIG. 7 lists five types of error counters and the relative scaled weights (to be described hereinafter) that REM analysis program (running in S8, FIG. 1) assigns to the reporting station and its NAUN for each type of isolating errors. As described previously, a count representative of the number of times the particular error was identified in the reporting station is reported in the isolating error count sub-vector field. REM multiplies this error count by the relative scaled weight to provide the accumulated relative error weight against each station. Thus, if the line error count as reported from a station in the error report MAC frame is X, the accumulated relative error weight for the reporting station is 2X and the accumulative relative error weight for the NAUN is 2X. Similarly, for internal errors the accumulative relative error weight for a reporting station is four times the value of the count in the error message and zero times the count in the error message for the NAUN. Accumulative relative error weights for burst errors, Address Recognized Indicator/Frame Copied Indicator (ARI/FCI) errors or abort transmit errors are calculated in a similar manner. Thus, it can be seen from the table of FIG. 7 that for a particular error domain line errors are distributed evenly between the reporting station and its NAUN; that internal errors are distributed to the reporting station only; that burst errors are distributed evenly between the reporting station and its NAUN; that ARI/FCI errors are distributed to the NAUN only and that abort transmit errors are distributed to the reporting station only. It should be noted that FIG. 7 is only an example of possible distribution. However, other types of distribution for error counters and relatively scaled weights can be used without departing from the scope or teachings of the present invention.

Based upon the above discussion and FIG. 2, it can be seen that within an error domain, such as AB, the error weight is distributed between the reporting station S3 and its NAUN S2. For example, in error domain AB a line error is detected by the receiver in S3. If the fault distribution in error domain AB is 20% to the transmitter (T), 70% to the receiver (R) and the remaining 10% to the wire or other communications media 12; and if the relative scaled weight of a fault is four, then, the error accumulation against S3 would be one while against S2 would be 3 for each occurrence of a line error.

For error domain AB, an internal error would be accumulated totally against the reporting station (S3).

Thus, four would be accumulated against S3 for each reported internal error.

A burst error is handled similar to a line error.

The ARI/FCI error detector fault domain is contained in the transmitter (T) of station S2, thus, a value of four would be accumulated against station S2 for each occurrence of ARI/FCI errors.

The abort transmitter error is handled in the same fashion as an internal error.

As can be seen from the above description, the error is distributed between the elements of an error domain by choosing two relative increment values for each error type. The sum of the two values is scaled such that error weight accumulation will reach a threshold value in a specified period of time given a specific background error rate.

The error reports are transmitted to a software program called REM which is running in a computer (such as an IBM PC) located in station S8. The REM analyzes the error reports and flags the stations which are causing excessive errors on the network. The results from processing the messages are stored in an isolating table shown in FIG. 6. The table contains a plurality of horizontal slots A through N. Each slot represents a record for recent history of error events calculated for a reporting (RPT) station and its NAUN. More particularly, each slot carries an error weight value, an alert flag, the address of the reporting station and the NAUN address. The error weight value is calculated by the REM program. The alert flag is a bit which is set by REM when the error weight exceeds a threshold value. The reporting station address and the NAUN address are supplied in the error message. Preferably, the slots are kept in descending error weight order. Thus, the station or NAUN having the highest error weight would be listed in slot A. The next highest error weight would be listed in slot B and so on. In addition, the number of slots in the table are considerably less than the number of stations in the network. This is so because the contents of the isolating table change rapidly and only those stations which are experiencing high error rates are allowed, for a particular ring network, to remain in the table. Stated another way, only stations which are reporting non-excessive errors are kept in the table for a short period of time. In a particular implementation 15 slots were able to support a ring carrying hundreds of stations.

The REM program that analyzes the error reports and posts its findings or results in the REM isolating table includes the following functions:

A weight accumulation due to soft error reports;

Weight decrement due to time;

Decrement rate adjustments;

Threshold value adjustments;

Timer tick for time base processing.

The weight accumulation function is performed as follows:

When a soft error report frame is received by the management station containing REM, the information contained in the error counts is used to accumulate "error weights" against two stations in the network.

The two stations are the station which generates the error report frame and its nearest active upstream neighbor (NAUN). The error weight accumulated is used as an indication of the likelihood that the associated ring station is causing the errors. The weight distribution between the reporting station and its NAUN is accomplished as follows.

Each error counter in the error report is multiplied by two numbers held in the reporting and NAUN station increment vectors. The number in the reporting station increment vector determines the weight accumulated against the reporting station as a result of the detected error type. Similarly, the number in the NAUN station increment vector determines the weight to be accumulated against the NAUN station as a result of the detected error type.

After each type of isolating error count has been multiplied by the two distribution factors which may be different for each type of isolating error, the results are summed into two accumulated weights, one weight for the reporting station and one weight for its NAUN. The accumulated weights are stored in the REM isolating table. Thereafter, when the REM program processes additional error reports, the generated weight is added to the current weight accumulated for the station and is stored in the table. Thus, as more error reports cause additional weight to be accumulated against a station, the total accumulated weight or likelihood that the network station is causing a persistent error condition increases.

It can be seen from the previous discussion that even if the errors are being randomly generated the accumulated weight for any station will continue to increase with time until the REM program perceives that there is an excessive error condition. To remove this problem, some concept of time must be included into the weight accumulation function. This is the function of the weight decrement process.

The weight decrement function simply decrements a fixed value from the accumulated weights for all stations in the REM isolating table at a periodic time interval. If this decrement results in an accumulated weight for a network station that is less than one, then the accumulated weight for the network station is set to zero.

Due to this periodic decrementing, only stations that are accumulating weight at a rate faster than the decrement rate for a time long enough to accumulate sufficient weight to exceed some threshold value will be considered sufficient and will be identified by the REM program. Stations that are only experiencing (background) more tolerable errors on the ring will not be accumulating weight at a sufficient rate to allow the weight to grow with time.

The error isolation technique described above would work for any ring or other type of network provided that the decrement rate and the threshold value are set appropriately for normal background error rates that occur on the ring. These error rates, however, vary from ring to ring and possibly from day to day. Therefore, a mechanism must be provided to allow the error analysis process to automatically adjust itself to the background error rate that the ring is currently experiencing. This mechanism is the threshold and decrement rate adjustments functions.

Stated another way, the relative error weight that is accumulated against the station when error reports are received by the REM program would continue to increase until the threshold value is reached. However, it is not desirable for the threshold to be reached unless the error rate is excessive. This requires that the error weights be decremented at a rate sufficient to allow excessive error weights to increase and non-excessive error weights to decrease. The rate of decrease (decrement rate) is controlled by the time between decrements called the decrement interval. The decrement interval should not be fixed if there are multiple sources of errors as is the case in a multi-station transmission system and if it is desired to remove only the worst error causing stations from the system. In a system that tolerates errors, the procedure insures that a maximum number of units remain in the system.

The decrement rate is controlled by the current number of adapters having non-zero accumulated weights. As stated previously, each station includes a device and the adapter that attaches it to the network or ring. Decrement rate as is used in this document is the amount of accumulated weight subtracted per station per unit time. The decrement rate is decreased if the number of adapters with non-zero accumulated weights are less than some specified minimum (to be described hereinafter). Conversely, the decrement rate is increased if the number of adapters with non-zero accumulated weights are greater than some specified maximum (to be described hereinafter). This method of adjusting the decrement rate allows the error analysis process to keep a decrement rate which is consistent with the soft error rate which the ring is currently experiencing.

The number of adapters causing errors on the ring is stored in slots in the isolating table, FIG. 6. In order to adjust the threshold and decrement interval, the REM program translates the number of entries in use to three states: namely, mostly empty, mostly full, and neither mostly empty nor mostly full. The REM program periodically adjusts the decrement rate based upon the state of the table. If the table is mostly empty (specified minimum), the decrement rate is decreased. If the table is mostly full (specified maximum), the decrement rate is increased. Finally, if the table is neither full nor empty, then no adjustment is made.

In a preferred embodiment, a table size of 15 slots was used to support a ring containing several hundred stations. The table was considered to be mostly empty with six slots in use. The table was considered to be mostly full with ten slots in use.

The above method for regulating the decrement rate can be adjusted to coincide with the error rate on the ring. However, by dynamically adjusting the decrement rate, another problem is introduced. When a ring is experiencing a high rate of soft error, the decrement rate is correspondingly high. Thus, the accumulated weight for an adapter will take longer to reach the threshold level at which the error analysis program will determine that a significant error condition is detected and isolated. Preferably, the threshold level should be extended over a range of values. In the fifteen table example previously cited, the range of values is 32 through 128. In order to compensate for this effect, the threshold level must be adjusted to reflect the rate at which errors are being processed by the error analysis program. This compensation results in the lowering of the threshold value when the decrement rate is high to offset the faster decrementing of the accumulated weights for the adapters. However, the threshold value should not fall below the lowest value in the range.

The timer ticker function provides time based processing and is called periodically (say, every two seconds).

Figure 5A:
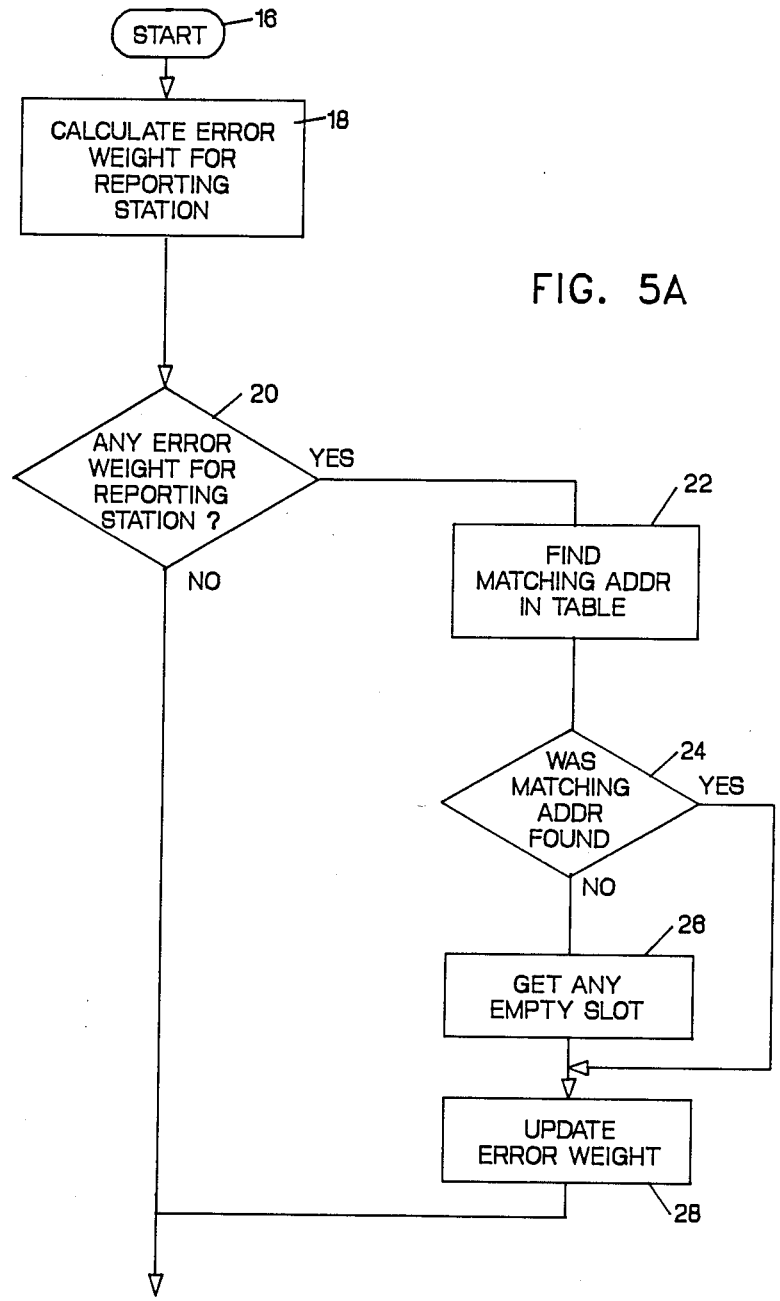
FIGS. 5A, 5B and 5C are flow charts illustrating the general operation of the invention.
Figure 5B:
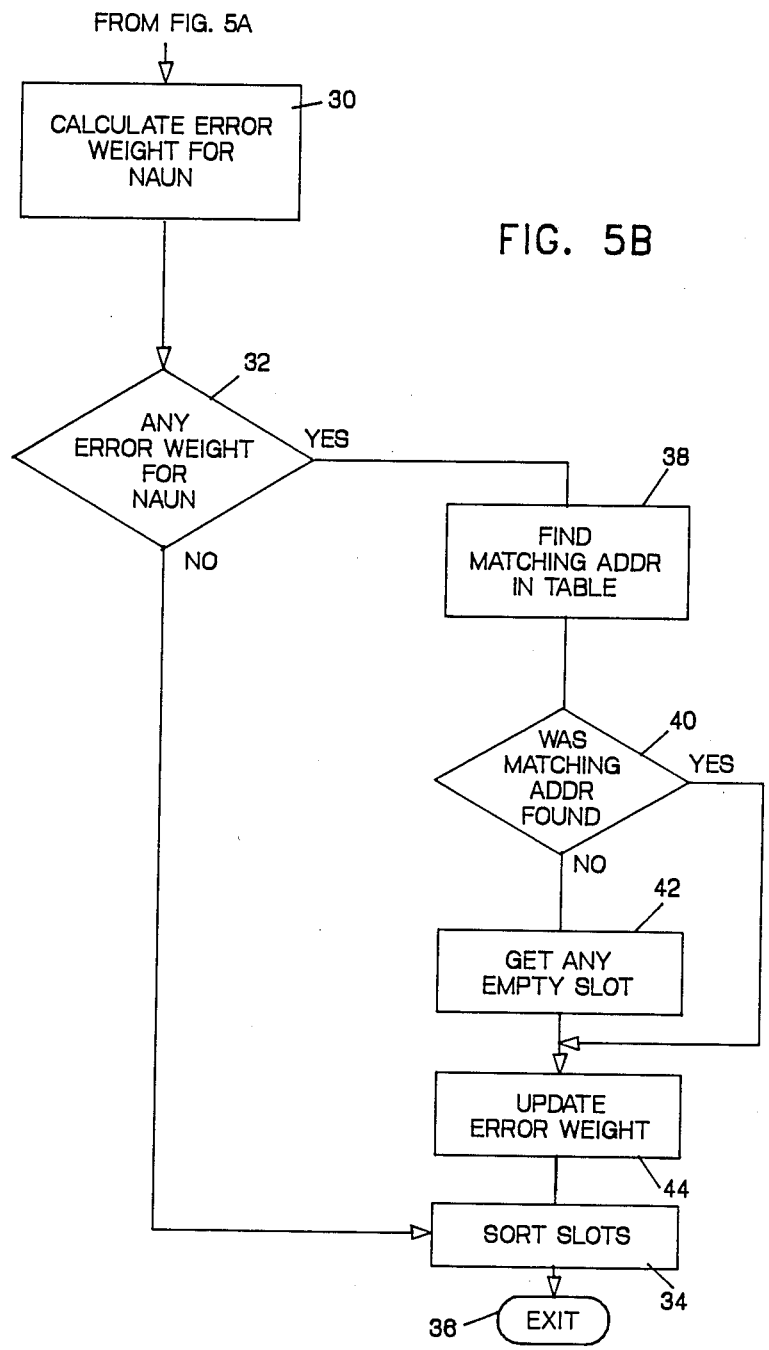
Figure 5C:
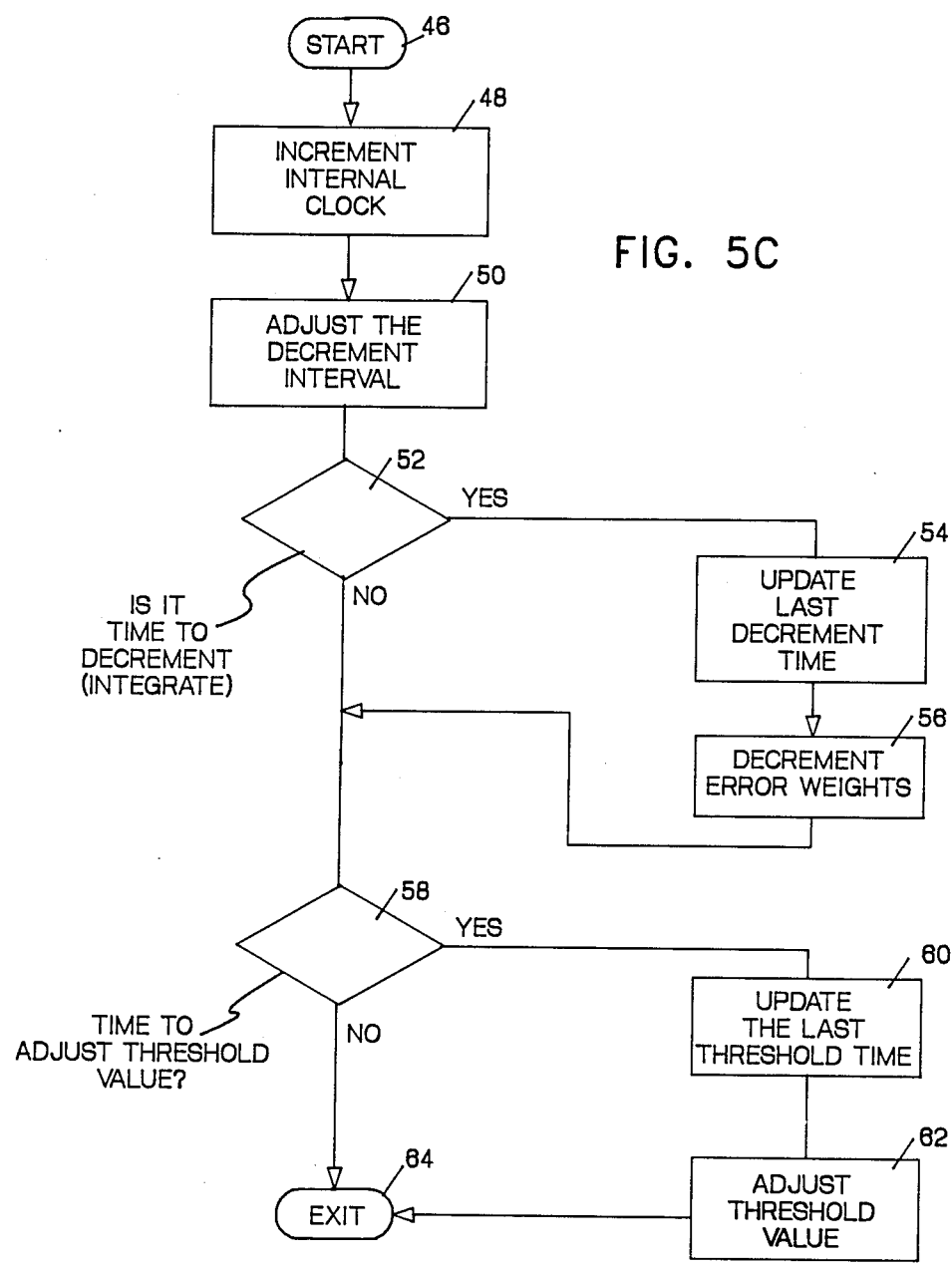

FIGS. 5A through 5C show flow diagrams for the weight accumulation process of the REM program. With reference to FIG. 5A, the program enters the process in block 16 and descends into block 18. In block 18 the program calculates the error weight for a reporting station. The relative error weight is calculated by multiplying the values in the report with the values in the reporting station increment vector. The program then descends into block 20. In block 20 the program checks to see if there is any error weight calculated for the reporting station. If there is any error weight, the program descends into block 22. In block 22 the program searches the isolating table to see if there is an address that matches the address of the reporting station in the last error report. The program then descends into block 24. If a matching address was not found, the program descends into block 26 to get an empty slot. In block 26 the program clears all fields of the slot and then enters the new reporting station information in the empty slot. Block 26 does not fill in the accumulated weight. The program then descends into block 28. If the matching address was found in block 24, the program exits along the yes path into block 28. In block 28 the program updates the error weight stored in the slot with the matching address with the relative weight for the reporting station accumulated in block 18. In updating the error weight, the program sums the newly calculated error weight with the error weight already in the table and compares the result with a value in the range of threshold values. If the result falls outside of the allowed range, the program sets the slot's flag in the table and raises an excessive error alert for this station. The program also prepares and transmits to a higher network management station a report indicating problems with a station on its assigned ring. The program then exits block 28 into block 30 (FIG. 5B).

Still referring to FIG. 5A, if there was no error weight for the reporting station (block 20), the program exits the block along the no path into block 30 (FIG. 5B).

In block 30 the program calculates the error weight for the nearest active upstream neighbor in the received message. This step is similar to the one described in block 18. Essentially, the program uses the value in the NAUN address increment vector and error counts in the error reports to calculate the error weight for the NAUN station. The program descends into block 32. In block 32 the program checks to see if any error weight was calculated for the NAUN. If there was no error weight, the program descends along the no path into block 34. In block 34, the program sorts the slots in the isolating table by descending error weight order. As a result, the station with the highest error weight is at the top and the one with the lowest is at the bottom. The program then exits the routine through block 36.

Still referring to FIG. 5B, if an error weight was calculated for the NAUN (block 32), the program exits along the yes path into blocks 38, 40, 42 and 44, respectively. The functions performed in blocks 38-44 are similar to the functions performed in blocks 22-28 (FIG. 5A). These functions have already been described and will not be repeated here.

FIG. 5C shows a flow chart for the timer tick function in the REM program. The function is called periodically (say, every two seconds) and performs a time-based processing. The program enters the routine in block 46 and descends into block 48. In block 48 the program increments the internal clock by two and descends into block 50. In block 50 the program adjusts the decrement interval. The decrement interval is adjusted as follows. If the table of slots is mostly empty, then increase the decrement interval by one. If the table of slots is mostly full, then decrease the decrement interval by one. In either case do not increment or decrement beyond the range of the decrement interval. If the table is neither mostly full nor mostly empty, then do not change the decrement interval.

The program then descends into decision block 52. There it checks to see if it is time to decrement (integrate) the error weights. If it is time, the program exits along the yes path into block 54. In block 54 the program updates the last decrement time and descends into block 56. In block 56 the program decrements the error weights. In particular, the program decrements the error weights of each slot that is not empty. If a slot's error weight becomes less than one, the program empties the slot and clears all of its fields. If a slot's flag field indicates that an alert has been raised, and if the error weight is less than 50% of the threshold value, the program removes the excessive soft error alert for this station. The program then descends into block 58. In block 58 the program checks to see if it is time to adjust the threshold value. If it is not time, the program exits along the no path through exit block 64. If it is time to adjust the threshold value, the program exits along the yes path into block 60. In block 60 the program updates the last threshold time and descends into block 62. In block 62, the program adjusts the threshold value, within its range, using the decrement interval as a key component. The program then exits the routine via block 64.

While the invention has been particularly shown and described with reference to a preferred embodiment hereof, it will be understood by those skilled in the art that various changes in form and details may be made therein without departing from the spirit and scope of the present invention.

We claim:

1. In a local area network having a plurality of data terminal equipment (DTE) coupled to a transmission media over which signals are carried for exchanging information between selected DTEs a method for predicting and isolating DTE with excessive rate of errors, comprising the steps of:
   (a) at each data terminal equipment, generating and transmitting error report messages, with each message including a first address field with an address for a reporting station, a second address field with an address for a destination station, a third address field with an address for the reporting station nearest active upstream neighbor (NAUN) and an information field carrying error information representative of detected errors;
   (b) receiving the message at the destination address;
   (c) for like reporting stations, correlating the error information in received error report messages and generating therefrom an error index representing the rate at which error is occurring at a DTE;
   (d) periodically adjusting each error index by a selected value;
   (e) comparing each resulting error index in step (d) with a threshold value selected from a range of threshold values; and
   (f) signaling an error condition for each resulting error index of step (e) falling outside of the threshold value.

2. The method of claim 1 wherein the error index includes weighted error counts.

3. The method of claim 1 wherein the error information includes a plurality of counts with each count corresponding to a different type of error.

4. The method of claim 3 wherein the error index generation of step (c) further includes the steps of:
   (g) multiplying the count for each type of error in a received message by values deemed to distribute the error between the reporting station and its NAUN;
   (h) summing those products for errors distributed against the reporting station and against its NAUN of step (g) to generate a single weighted error count for the reporting station and a single weighted error count for its NAUN; and
   (i) for a currently received error message, adding each of the single weighted error count in step (h) with previously calculated single weighted error counts for like reporting stations and NAUNs.

5. The method set forth in claim 1 further including the step of partitioning the local area network into one or more error domains and transmitting the error report messages from each error domain.

6. The method of claim 5 wherein an error domain includes a reporting station, a NAUN of said reporting station and the transmission media interconnecting said reporting station and its NAUN.

7. A method for predicting and identifying failure in a local area network or like machine before failure occurs comprising the steps of:
   (j) monitoring signals from the local area network or like machine; said signals including a first sequence of electrical indicia representing an address of a reporting station, a second sequence of electrical indicia representing an address for a reporting station NAUN, a third sequence of electrical indicia representing an address for a destination station and a fourth sequence of electrical indicia representing error counts;
   (k) analyzing the signals and generating therefrom a table of values representative of weighted error counts detected in said local area network or the like machine;
   (l) at a fixed interval, adjusting each value in the table of step (k) by a fixed constant;
   (m) comparing each value in step l with a fixed threshold value; and
   (n) signaling an error condition for values exceeding the threshold value.

8. The method of claim 7 wherein the interval for adjusting step (l) varies.

9. The method of claim 8 wherein the interval is being varied as a function of the number of entries in the table.

10. The method set forth in claim 9 wherein the threshold value in step (m) is a function of the interval.

11. A device for predicting and identifying failure in a local area network or like machine before failure occurs comprising:
    means at stations in the local area network for generating signals including an address for a reporting station, an address for the reporting station NAUN, an address for a destination station and an information field with error counts representative of errors detected in said local area network;
    means provided at the destination station for processing the signals and generating therefrom a table of values representative of weighted error counts calculated for stations connected in said local area network or the like machine;
    means provided at the destination station for accessing the table of values and adjusting the values therein;

means provided at the destination station for comparing each adjusted value with a threshold value selected from a range of threshold values; and means provided at the destination station for signaling an error condition for values exceeding the selected threshold value.

12. The device set forth in claim 11 wherein the means for signaling the error condition further includes means for accessing the table of values and setting error flags to identify values which exceed the threshold value.

13. In a local area network having a plurality of DTEs interconnected by a communications media a method for predicting and isolating sections which are having excessive errors, comprising the steps of:

(a) at selected station, generating and transmitting an error report message including an address for a reporting station, an address for a destination station, the address of the reporting station NAUN and an information field containing error counts sorted by error type;

(b) receiving the message at the destination station;

(c) analyzing the message and generating therefrom weighted error counts for each reporting station and its NAUN;

(d) generating a table having a field for addresses of a reporting station, a field for the addresses of the NAUN and a field for weighted error counts;

(e) correlating the weighted error counts with respective reporting station and NAUN and storing in said table indicia representing the address of the reporting station its NAUN and associated weighted error counts calculated in step (c);

(f) thereafter, for each received message calculating weighted error counts for the reporting station and its NAUN contained within said message;

(g) algebraically summing the weighted error counts of step (f) with stored weighted error counts of step (e) only if stations addresses in the table and the message of step (f) are alike;

(h) for stations having matching addresses, replacing the weighted error count in step (e) with the weighted error count in step (g);

(i) periodically adjusting the weighted error count of step (h) with a predetermined number;

(j) comparing each adjusted error count with a range of threshold values; and (k) signaling an error condition if the adjusted error count in step (j) falls outside of a predetermined range.

14. In a local area network having a plurality of data terminal equipment (DTE) coupled to a transmission media over which signals are carried for exchanging information between selected DTEs a method for predicting and isolating DTE with excessive error rates, comprising the steps of:

(a) at each data terminal equipment, generating and transmitting error report messages, with each message including a first address field with an address for a reporting station, a second address field with an address for a destination station, a third address field with an address for the reporting station nearest active upstream neighbor (NAUN) and an information field carrying error information representative of detected errors;

(b) receiving the message at the destination address;

(c) for like reporting stations, correlating the error information in received error report messages and generating therefrom error indexes representing the rate at which error is occurring at DTEs;

(d) comparing each error index in step (c) with a threshold value selected from a range of threshold values; and (e) signaling an error condition for each error index of step (d) falling outside of the threshold value.

* * * * *